(12) United States Patent
Ekenberg

(10) Patent No.: US 6,883,319 B2
(45) Date of Patent: Apr. 26, 2005

(54) METHOD FOR CONTROLLING THE CHARGING PRESSURE AT A TURBOCHARGED COMBUSTION ENGINE, AND A CORRESPONDING COMBUSTION ENGINE

(75) Inventor: Martin Ekenberg, Lomma (SE)

(73) Assignee: Saab Automobile AB (SE)

( * ) Notice: Subject to any disclaimer, the term of this patent is extended or adjusted under 35 U.S.C. 154(b) by 20 days.

(21) Appl. No.: 10/473,440
(22) PCT Filed: Mar. 27, 2002
(86) PCT No.: PCT/SE02/00614
§ 371 (c)(1), (2), (4) Date: Sep. 30, 2003
(87) PCT Pub. No.: WO02/079624
PCT Pub. Date: Oct. 10, 2002

(65) Prior Publication Data
US 2004/0089278 A1 May 13, 2004

(30) Foreign Application Priority Data
Mar. 30, 2001 (SE) .............................................. 0101143

(51) Int. Cl.⁷ ........................... F02D 23/00; F02B 37/12
(52) U.S. Cl. ........................ 60/602; 60/605.1; 123/315
(58) Field of Search .............................. 60/602, 605.1; 123/315, 316, 90.15, 90.16, 90.17

(56) References Cited

U.S. PATENT DOCUMENTS 4,916,903 A * 4/1990 Holmer ..................... 60/605.1
6,595,183 B1 * 7/2003 Olofsson .................... 123/315

FOREIGN PATENT DOCUMENTS

| DE | 3821935 A1 | * | 2/1990 | ........... F02B/37/12 |
| GB | 2185286 | | 7/1987 | ................. 60/605.1 |
| JP | 57163121 A | * | 10/1982 | ................. 60/605.1 |
| JP | 05263671 A | * | 10/1993 | ................. 60/605.1 |
| SE | 507030 | | 3/1998 | ................... 60/602 |
| SE | 512943 | | 6/2000 | ................... 60/602 |

* cited by examiner

Primary Examiner—Thai-Ba Trieu
(74) Attorney, Agent, or Firm—Ostrolenk, Faber, Gerb & Soffen, LLP

(57) ABSTRACT

A multicylinder internal combustion engine with an exhaust-driven turbocompressor and with a divided exhaust gas flow has at least two exhaust valves (2,3) and one intake valve per cylinder. A first exhaust valve (2) is connected to a first exhaust manifold which leads to the turbine of the compressor, while a second exhaust valve (3) is connected to a second exhaust manifold which opens downstream of the turbine. The charging pressure in the engine can be regulated by virtue of the opening periods of the exhaust valves (2,3) being varied in relation to one another in order to adapt the flow through the exhaust turbine to a value which provides the desired charging pressure in the engine. By opening the second exhaust valve (3) increasingly earlier, an increasingly lower charging pressure can be achieved.

13 Claims, 1 Drawing Sheet

METHOD FOR CONTROLLING THE CHARGING PRESSURE AT A TURBOCHARGED COMBUSTION ENGINE, AND A CORRESPONDING COMBUSTION ENGINE

TECHNICAL FIELD

The invention relates to on the one hand a method for controlling the charging pressure in an internal combustion engine and particularly to set a desired charging pressure in the engine.

STATE OF THE ART

Within vehicle technology, use is frequently made of the supercharging of internal combustion engines in order to achieve greater engine power at great speed. Supercharging is achieved in this connection by means of a compressor driven by the engine. A common solution is for such a compressor to be driven by an exhaust turbine driven by the exhaust gases of the engine. One problem with this solution is that, with a powerful exhaust gas flow, a high charging pressure will be obtained, with an attendant risk of engine damage if the charging pressure becomes too high.

According to a known solution to this problem, the exhaust turbine is provided with a safety valve, what is known as a wastegate valve, which, at a predetermined pressure in the compressor outlet in the inlet system of the engine, reduces the pressure in the exhaust turbine by opening and discharging a certain exhaust gas flow from the exhaust turbine on to the exhaust system. In this way, the capacity of the compressor is reduced so that the supercharging is brought down to a safe level. One problem in this connection is that the valve used complicates the turbocompressor used and is forced to work in a high-temperature environment. Moreover, defective functioning can have disastrous consequences for the engine.

THE OBJECT OF THE INVENTION

One object of the invention is to eliminate the drawbacks of the known solution and to produce a better and safer solution. Another object is to achieve this using simple means.

DISCLOSURE OF THE INVENTION

These objects are achieved on the one hand by a method including providing a divided exhaust flow from the cylinders, with one flow through the turbine of a turbocompressor, and varying the opening periods of the respective exhaust valves of the two exhaust flows to adapt the exhaust gas flow through the exhaust turbine to a value to set a desired charging pressure. The invention relates to an internal combustion engine provided with these features.

By making use of the divided exhaust period principle, which is known per se, according to patent specification GB 2 185 286, where the exhaust gas flow is, by means of double exhaust valves, divided into two different flows with one flow to the exhaust turbine and one flow past the exhaust turbine, and changing the proportions between these two flows during operation, it is possible to change and limit the charging pressure in the engine without the assistance of a wastegate valve in the exhaust turbine. This is suitably achieved by changing the opening period of the exhaust valve which guides one flow past the exhaust turbine. By increasing this exhaust gas flow, the exhaust gas flow through the exhaust turbine can be reduced, with attendant lowering of the charging pressure in the engine.

Further advantages and features of the invention emerge from the description below.

The invention is explained in greater detail below by means of an illustrative embodiment shown in the accompanying drawing.

DESCRIPTION OF ILLUSTRATIVE EMBODIMENT

Figure 1:
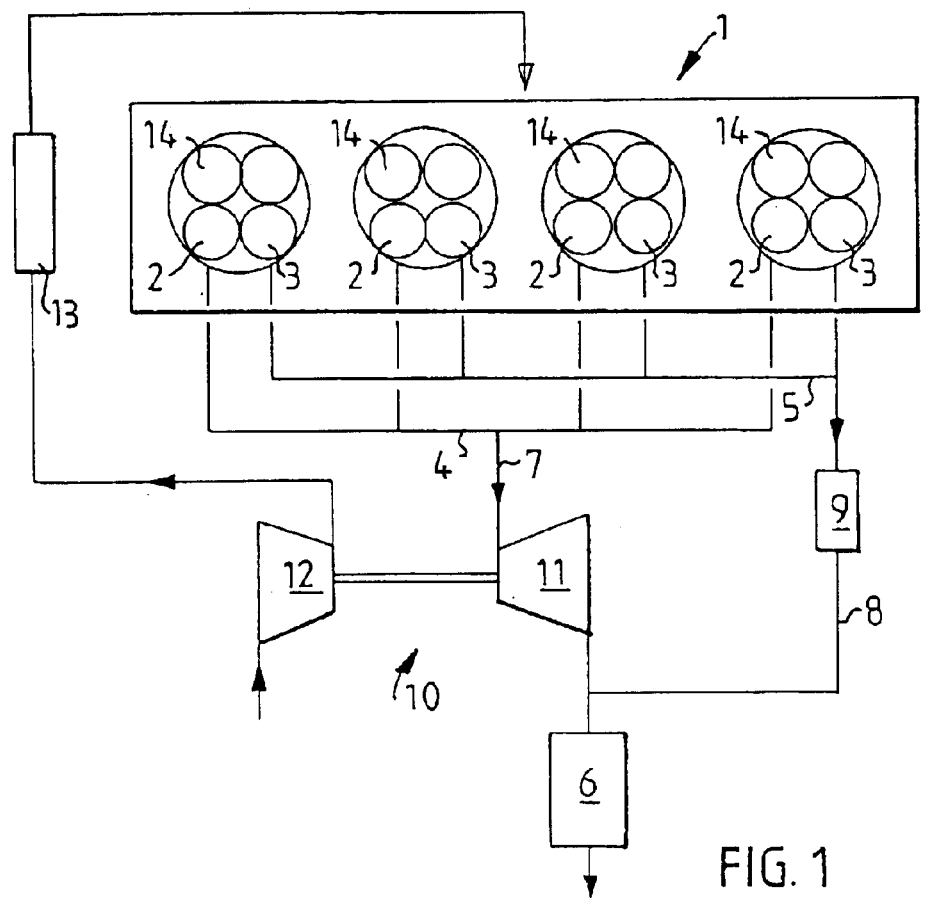
FIG. 1 shows an internal combustion engine according to the invention.

FIG. 1 shows diagrammatically a multicylinder internal combustion engine 1 according to the invention in the form of an Otto engine. The cylinders of the engine each have at least two exhaust valves 2 and 3. Exhaust gases are conducted out from the first exhaust valves 2 of the cylinders to a first exhaust manifold 4 common to the cylinders. Exhaust gases are conducted out from the second exhaust valves 3 of the cylinders to a second exhaust manifold 5 common to the cylinders. The first exhaust manifold 4 is connected to a first catalyst 6 via a first exhaust line 7, and the second exhaust manifold 5 is connected to the first catalyst 6 via a second exhaust line 8 which here contains a second catalyst 9. One or more silencers (not shown) is or are located downstream of the catalyst 6 in a conventional manner.

The engine 1 is also equipped for supercharging by means of an exhaust-driven turbocompressor 10 (or turbocharger), the turbine 11 of which is connected in the first exhaust line 7 and is therefore fed from the first exhaust manifold 4 and the first exhaust valves 2. A compressor 12 driven by the turbine 11 supplies the engine with charging air which, if appropriate, is cooled in a cooler 13. This charging air is fed into each cylinder in a conventional manner via one or more intake valves 14 (not shown in detail).

Figure 2:
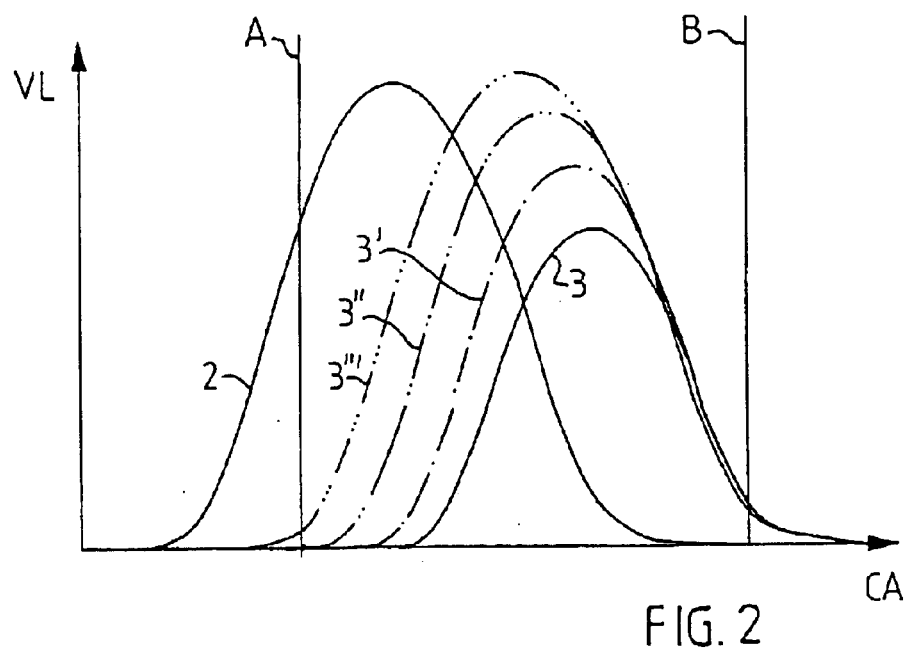
FIG. 2 shows the opening relationship between two exhaust valves in a cylinder in different operating situations.

The engine 1 described here therefore has a divided exhaust gas flow according to the principle described in the patent specification mentioned, GB 2 185 286. The interaction between the two exhaust valves 2 and 3 in each cylinder is shown in diagrammatic form in FIG. 2. The horizontal axis represents the crankshaft angle CA of the engine, while the vertical axis represents the value of the valve lift VL. The normal movement of the two exhaust valves is shown by curves 2, 3 (solid lines). As can be seen, the two exhaust valves 2 and 3 are open with a certain stagger in relation to one another during the exhaust stroke of the piston between a bottom dead center position A and a top dead center position B. The first exhaust valve 2 opens before the piston has reached its bottom dead center position A and closes before the piston has reached its top dead center position B. On the other hand, according to the normal case shown by the solid line, the second exhaust valve 3 does not open until the piston has passed its bottom dead center position A and remains open for a period after the piston has passed its top dead center position B.

According to the invention, the opening period of the second exhaust valve 3 can be changed in such a manner that, when necessary, it opens earlier and more than in the normal case shown by the solid line. Examples of such a changed opening period are shown by the curves 3', 3" and 3''' (broken lines), the curves in turn showing an increasingly long opening period. By increasing the opening period of the second exhaust valve 3 in this way, an increasing quantity of exhaust gases from the engine can be led past the turbine 11, with the result that the power of the latter is reduced and a smaller quantity of air is fed into the engine by means of the compressor 12. This in turn leads to the possibility of regulating the charging pressure in the engine to a desired level by suitable selection of opening period of the second exhaust valve 3. In this way, it is possible to regulate the charging pressure without using a previously customary wastegate valve in the turbine.

Changing the movement of the second exhaust valve 3 can take place in a number of different ways, as required and desired. One possibility is, for example, to use variable geometry on a camshaft intended for the exhaust valves. Another possibility is to use electromechanically operating valve depressors which can be electrically controlled as required. If appropriate, these solutions can be combined or replaced by other solutions available to the person skilled in the art, all within the scope of the invention.

In addition to the solution shown here of advancing the opening of the second exhaust valve 3, it is also possible to vary the closing of the first exhaust valve 2. If appropriate, these solutions can be combined. In this connection, a technique similar to that used for the second exhaust valve 3 can be used for acting on the first exhaust valve 2.

According to the invention, it is therefore a matter of regulating the opening periods of the two exhaust valves 2, 3 in relation to one another so that the exhaust gas flow through the exhaust turbine is adapted to a value which provides the desired charging pressure in the engine.

For various reasons, it is becoming increasingly common at high power output to drive engines with an increasingly small fuel excess, with the result that a high exhaust gas temperature is obtained. The solution proposed according to the invention eliminates the difficulty of bringing about good cooling of a wastegate valve in the turbine, which is exposed to increasingly high exhaust gas temperatures. Good cooling of the first exhaust valve 2 can instead be ensured by suitable design of water cooling ducts around this valve in the engine.

The second catalyst 9 is suitably positioned close to the engine and is intended for a limited exhaust gas flow. When the engine is started, the first exhaust valve 2 is suitably kept closed for a short period so as to allow all exhaust gases to pass through the second catalyst 9 and heat the latter up rapidly and in this way achieve effective exhaust gas purification. In order for it to be possible, according to the invention, to receive an increased exhaust gas quantity in the case of high engine loading, the second catalyst 9 has to have a size adapted for such an increased exhaust gas flow.

The invention can of course also be applied in an embodiment where there is no second catalyst 9.

What is claimed is:

1. A method for controlling the charging pressure in an exhaust-driven turbocompressor which is connected to an internal combustion engine, where the engine has at least one cylinder, an intake valve per cylinder, a divided exhaust gas flow and at least two exhaust valves including a first exhaust valve connected via a first exhaust manifold to an exhaust-driven turbine of the turbocompressor and a second exhaust valve connected via a second exhaust manifold to an exhaust system of the engine downstream of the exhaust driven turbine, the method comprising varying opening periods of the exhaust valves in relation to one another in order to adapt the exhaust gas flow through the exhaust turbine to a value which provides a desired charging pressure in the engine and opening the second exhaust valve increasingly earlier as the desired charging pressure is lowered.

2. The method as claimed in claim 1, wherein valve lift of the second exhaust valve is made greater the earlier the second exhaust valve opens.

3. The method as claimed in claim 2, further comprising closing the second exhaust valve at the same time irrespective of the desired charging pressure.

4. The method as claimed in claim 2, further comprising opening and closing the first exhaust valve in the same manner irrespective of the desired charging pressure.

5. The method as claimed in claim 1, further comprising closing the second exhaust valve at the same time irrespective of the desired charging pressure.

6. The method as claimed in claim 1, further comprising opening and closing the first exhaust valve in the same manner irrespective of the desired charging pressure.

7. An internal combustion engine comprising a plurality of cylinders, a turbocompressor for supercharging the engine including an exhaust driven turbine having an inlet; and a divided exhaust gas flow from each of the cylinders and an exhaust system from the engine, each cylinder having a first exhaust valve, a first exhaust manifold connecting the first exhaust valve to the inlet of the exhaust-driven turbine, a second exhaust valve, a second exhaust manifold connecting the second exhaust valve to the exhaust system of the engine and downstream of the exhaust turbine, the exhaust valves having respective opening periods which are variable in relation to one another to adapt the exhaust gas flow through the exhaust turbine to a value which provides a desired charging pressure in the engine, the second exhaust valve having a variable opening period and being operable to have a shorter opening period for a higher charging pressure than for a lower charging pressure, and the first exhaust valve not having a variable opening period.

8. The internal combustion engine as claimed in claim 7, wherein the second exhaust valve is operable to open increasingly earlier for a decreasing charging pressure.

9. The internal combustion engine as claimed in claim 8, wherein the second exhaust valve is operable to have an increasing lifting movement for a decreasing charging pressure.

10. The internal combustion engine as claimed in claim 8, characterized in that the second exhaust valve has a closing point which is unchanged for different charging pressures.

11. An internal combustion engine comprising a plurality of cylinders, a turbocompressor for supercharging the engine including an exhaust driven turbine having an inlet; and a divided exhaust gas flow from each of the cylinders and an exhaust system from the engine, each cylinder having a first exhaust valve, a first exhaust manifold connecting the first exhaust valve to the inlet of the exhaust-driven turbine, a second exhaust valve, a second exhaust manifold connecting the second exhaust valve to the exhaust system of the engine and downstream of the exhaust turbine, the exhaust valves having respective opening periods which are variable in relation to one another to adapt the exhaust gas flow through the exhaust turbine to a value which provides a desired charging pressure in the engine, the second exhaust valve being operable to open increasingly earlier for a decreasing charging pressure.

12. The internal combustion engine as claimed in claim 11, wherein the second exhaust valve is operable to have an increasing lifting movement for a decreasing charging pressure.

13. The internal combustion engine as claimed in 11, wherein the second exhaust valve has a closing point which is unchanged for different charging pressures.

* * * * *